(12) United States Patent
Mallik et al.

(10) Patent No.: US 9,237,434 B2
(45) Date of Patent: Jan. 12, 2016

(54) NETWORK-ASSISTED PEER DISCOVERY WITH NETWORK CODING

(75) Inventors: Siddhartha Mallik, San Diego, CA (US); Andrea Munari, Mogliano Veneto (IT); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 13/546,629

(22) Filed: Jul. 11, 2012

(65) Prior Publication Data

US 2013/0016629 A1 Jan. 17, 2013

Related U.S. Application Data

(60) Provisional application No. 61/507,399, filed on Jul. 13, 2011.

(51) Int. Cl.
*H04L 12/28* (2006.01)
*H04W 8/00* (2009.01)
*H04W 48/10* (2009.01)

(52) U.S. Cl.
CPC .............. *H04W 8/005* (2013.01); *H04W 48/10* (2013.01)

(58) Field of Classification Search
CPC .............................. H04W 8/005; H04W 48/10
See application file for complete search history.

(56) References Cited

U.S. PATENT DOCUMENTS 8,069,235 B2   11/2011   Koh et al.
2003/0154254 A1*   8/2003   Awasthi ...................... 709/206
2004/0162871 A1   8/2004   Pabla et al.
2006/0242536 A1*   10/2006   Yokokawa et al. ............ 714/758
2007/0025241 A1*   2/2007   Nadeau et al. ................. 370/229

(Continued)

FOREIGN PATENT DOCUMENTS

GB       2446951 A        8/2008
JP       2010141805 A     6/2010
WO       WO-2011046962 A1 4/2011
WO       WO-2012131512 A1 10/2012

OTHER PUBLICATIONS

Deb, et al., "Algebraic Gossip: A Network Coding Approach to Optimal Multiple Rumor Mongering," IEEE Transactions on Information Theory, vol. 52, No. 6, Jun. 2006, pp. 2486-2507.

(Continued)

*Primary Examiner* — Ajay Cattungal
(74) *Attorney, Agent, or Firm* — Norton Rose Fulbright US LLP

(57) ABSTRACT

Techniques for performing network-assisted peer discovery with network coding are disclosed. For peer discovery with network coding, a device may generate a network-coded message based on a message assigned to the device and one or more messages received by the device from other devices. The device may transmit a proximity detection signal including the network-coded message. For network-assisted peer discovery with network coding, the device may register with a network for peer discovery and may be provided with at least one parameter to use for peer discovery with network coding. The devices may perform peer discovery with network coding in accordance with the peer discovery parameter(s) received from the network. The device may generate a network-coded message based on the at least one peer discovery parameter and may transmit the network-coded message to enable other devices to detect the device.

46 Claims, 9 Drawing Sheets

(56) References Cited

U.S. PATENT DOCUMENTS

| | | | |
|---|---|---|---|
| 2008/0107079 A1* | 5/2008 | Bae et al. | 370/331 |
| 2008/0198795 A1* | 8/2008 | Kim et al. | 370/328 |
| 2009/0274066 A1* | 11/2009 | Chen et al. | 370/254 |
| 2009/0285119 A1 | 11/2009 | Horn et al. | |
| 2009/0287827 A1 | 11/2009 | Horn et al. | |
| 2010/0165882 A1* | 7/2010 | Palanki et al. | 370/254 |
| 2010/0172432 A1* | 7/2010 | Li et al. | 375/295 |
| 2010/0260189 A1 | 10/2010 | Ansari et al. | |
| 2011/0087768 A1 | 4/2011 | Wu et al. | |
| 2011/0258313 A1 | 10/2011 | Mallik et al. | |
| 2011/0280123 A1* | 11/2011 | Wijnands et al. | 370/228 |

OTHER PUBLICATIONS

Partial International Search Report—PCT/US2012/046485—ISA/EPO—Oct. 26, 2012.

International Search Report and Written Opinion—PCT/US2012/046485—ISA/EPO—Jun. 4, 2013.

Jafarisiavoshani M., et al., "Bottleneck Discovery and Overlay Management in Network Coded Peer-to-Peer Systems", INM'07, Aug. 27, 2007, XP055189322, 6 Pages. Retrieved from the Internet:URL:http://conferences.sigcomm.org/sigcomm/2007/inm/papers/inm07-1569047381.pdf [retrieved on May 13, 2015].

* cited by examiner

NETWORK-ASSISTED PEER DISCOVERY WITH NETWORK CODING

The present application claims priority to provisional U.S. Application Ser. No. 61/507,399, entitled "NETWORK-ASSISTED PEER DISCOVERY WITH NETWORK CODING," filed Jul. 13, 2011, and incorporated herein by reference in its entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of devices. A device may communicate with a base station for WAN communication. A device may also be able to communicate directly with one or more other devices for P2P communication. It may be desirable to efficiently support P2P communication between devices.

SUMMARY

Techniques for efficiently performing peer discovery to detect other devices for P2P communication are disclosed herein. In one aspect of the present disclosure, peer discovery with network coding may be performed to improve performance. For peer discovery with network coding, a device may generate a network-coded message based on a message assigned to the device as well as one or more messages received by the device from other devices. The device may then transmit a proximity detection signal comprising the network-coded message. Each device may transmit combinations of messages, instead of simply its own message, for peer discovery. This may enable each device to be detected by more devices.

In another aspect of the present disclosure, peer discovery with network coding may be performed with network assistance. For network-assisted peer discovery with network coding, a device may register with a network entity for peer discovery and may be provided with at least one peer discovery parameter to use for peer discovery with network coding. The device may then perform peer discovery with network coding in accordance with the at least one peer discovery parameter. The device may generate a network-coded message based on the at least one peer discovery parameter. The device may transmit the network-coded message to enable other devices to detect the device.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
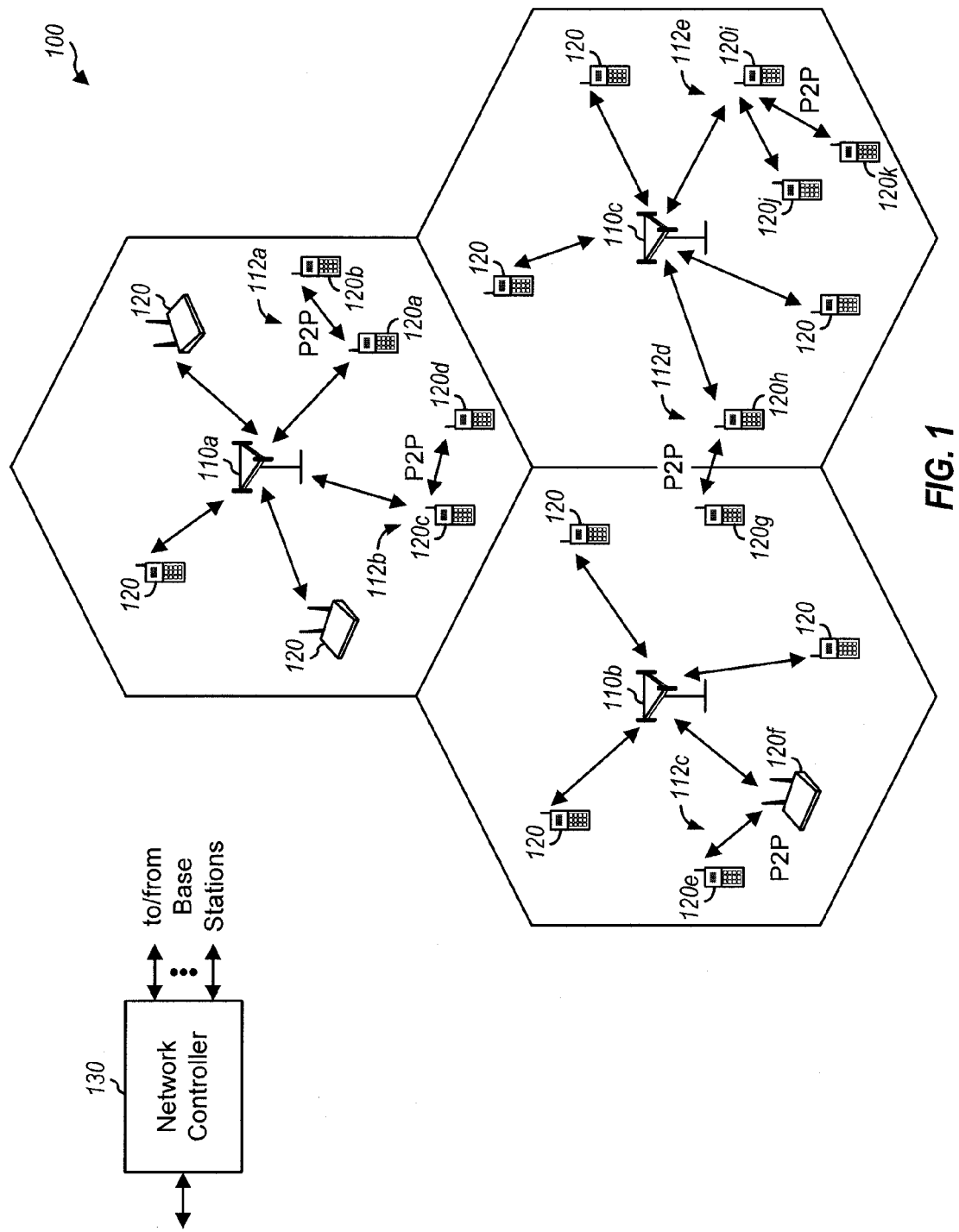
FIG. 1 shows a wireless communication network.

FIG. 1 shows a wireless communication network (or WAN) 100, which may be an LTE network or some other wireless network. Wireless network 100 may include a number of base stations and other network entities. For simplicity, only three base stations 110*a*, 110*b* and 110*c* and one network controller 130 are shown in FIG. 1. A base station may be an entity that communicates with devices and may also be referred to as a Node B, an evolved Node B (eNB), an access point, etc. Each base station may provide communication coverage for a particular geographic area and may support communication for the devices located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, the 3GPP concept of "cell" is used herein.

A base station may provide communication coverage for a macro cell, a pico cell, a femto cell, and/or other types of cell. A macro cell may cover a relatively large geographic area (e.g., several kilometers in radius) and may allow unrestricted access by devices with service subscription. A pico cell may cover a relatively small geographic area and may allow unrestricted access by devices with service subscription. A femto cell may cover a relatively small geographic area (e.g., a home) and may allow restricted access by devices having association with the femto cell (e.g., devices in a Closed Subscriber Group (CSG)). In the example shown in FIG. 1, wireless network 100 includes macro base stations 110a, 110b and 110c for macro cells. Wireless network 100 may also include pico base stations for pico cells and/or home base stations for femto cells (not shown in FIG. 1). Wireless network 100 may also include relays that can receive transmissions from upstream/source stations (e.g., base stations) and forward the received transmissions to downstream/destination stations (e.g., devices).

Network controller 130 may couple to a set of base stations and may provide coordination and control for these base stations. Network controller 130 may communicate with the base stations via a backhaul. The base stations may also communicate with one another via the backhaul.

Devices 120 may be dispersed throughout wireless network 100, and each device may be stationary or mobile. A device may also be referred to as a node, a user equipment (UE), a station, a mobile station, a terminal, an access terminal, a subscriber unit, etc. A device may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc. A device may be able to communicate with base stations, other devices, etc.

In the present description, "WAN communication" refers to communication between a device and a base station, e.g., for a call with a remote entity such as another device. A "WAN device" is a device that is interested or engaged in WAN communication. "P2P communication" refers to direct communication between two or more devices, without involving a base station. A "P2P device" is a device that is interested or engaged in P2P communication. A P2P device may also be referred to as a peer device, etc. A given device may be a WAN device and/or a P2P device. A P2P group refers to a group of two or more devices interested or engaged in P2P communication.

In the example provided in FIG. 1, a P2P group 112a includes devices 120a and 120b under the coverage of base station 110a. A P2P group 112b includes devices 120c and 120d also under the coverage of base station 110a. A P2P group 112c includes devices 120e and 120f under the coverage of base station 110b. A P2P group 112d includes devices 120g and 120h under the coverage of different base stations 110b and 110c. A P2P group 112e includes devices 120i, 120j and 120k under the coverage of base station 110c. The other devices 120 in FIG. 1 may be engaged in WAN communication.

In general, a wireless network may include any number of P2P devices that may be spread over a wide area. Not all P2P devices may be able to communicate with each other over a wireless link.

P2P devices may perform peer discovery in order to detect other devices of interest within radio frequency (RF) range. Devices that communicate peer-to-peer may occasionally (e.g., periodically) transmit proximity detection signals (PDS) for peer discovery. A proximity detection signal may also be referred to as a peer detection signal, a peer discovery signal, etc. A proximity detection signal may comprise a message carrying pertinent information for a device transmitting the signal. A message may also be referred to as a packet, etc. In one example, the message may convey identification information such as a device identity (ID), a network address (e.g., an IP address), and/or other information that can be used to identify the device, to establish a direct link, to support network configuration, etc. The message may also convey service information such as services offered and/or requested by a device. Each P2P device may be associated with a different message that may be transmitted to convey information about that P2P device.

Figure 2:
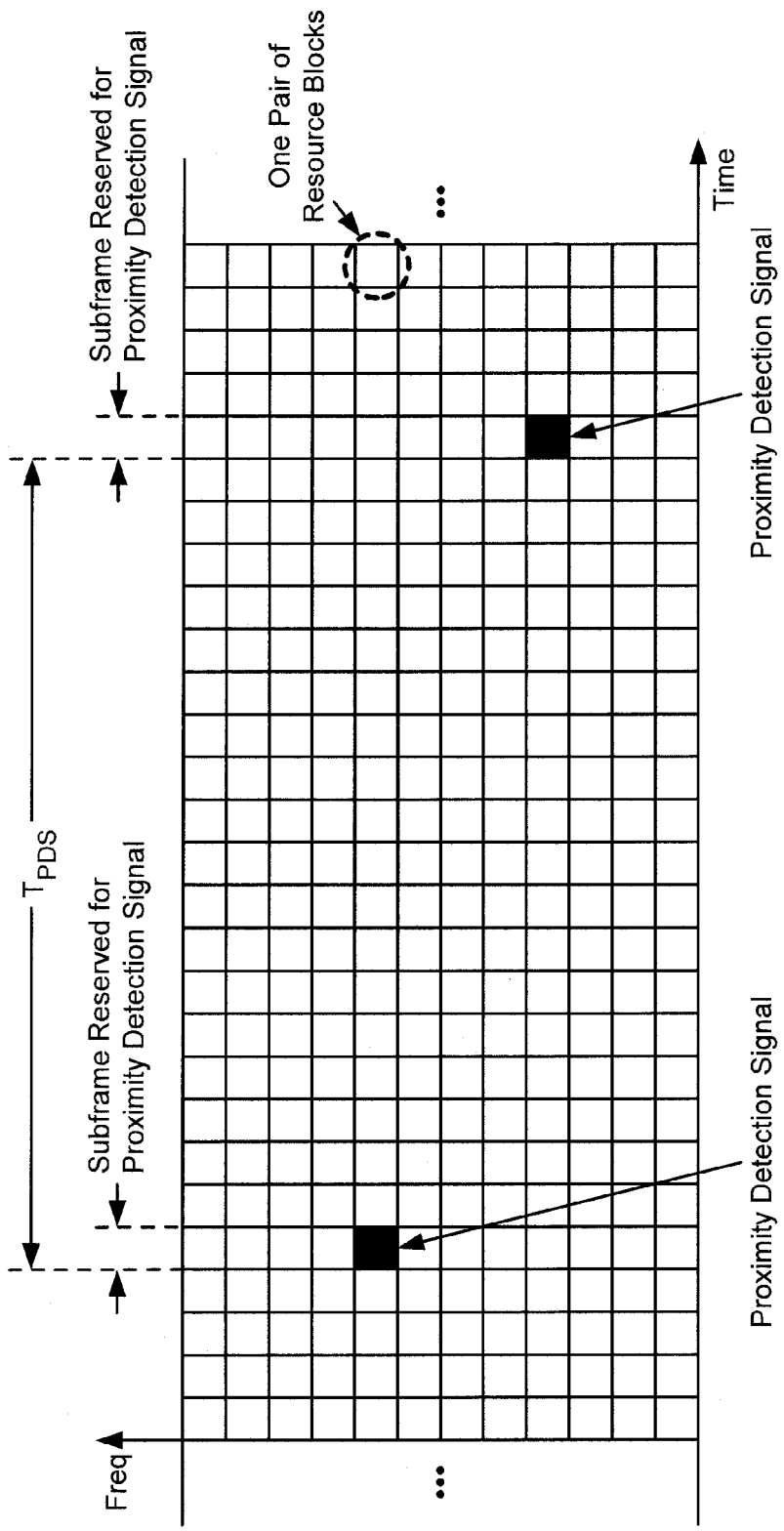
FIG. 2 shows a design of transmitting proximity detection signals.

FIG. 2 shows one aspect of transmitting proximity detection signals. The transmission timeline may be partitioned into units of subframes. Each subframe may include two slots, and each slot may include a number of symbol periods (not shown in FIG. 2). Each symbol period may have a predetermined duration. Each subframe may include a number of resource blocks (RBs). Each resource block may cover 12 subcarriers in one slot.

In one design, some subframes may be reserved for transmission of proximity detection signals by devices and may be referred to as PDS subframes. The PDS subframes may be spaced apart by $T_{PDS}$ milliseconds (ms), which may be referred to as the PDS periodicity, as shown in FIG. 2. A PDS subframe may include a set of resource blocks available for transmission of proximity detection signals. This set of available resource blocks may include some or all of the resource blocks in a PDS subframe. In one design, a device may transmit a proximity detection signal on one pair of resource blocks in a PDS subframe. A proximity detection signal may also be transmitted on fewer or more resource blocks.

In general, some resources may be reserved for transmission of proximity detection signals in connection with peer discovery. The reserved resources may comprise time-frequency resources, which may correspond to all resource blocks in certain subframes, or certain bandwidth in some subframes, or certain symbol periods in some subframes, or time-frequency resources determined in any manner. The reserved resources may also comprise sequences, codes, and/or other types of resources.

Peer discovery (e.g., transmission and/or detection of proximity detection signals) may be controlled by a Medium Access Control (MAC) layer in a protocol stack on a device. Alternatively or additionally, peer discovery may be controlled by one or more other layers in the protocol stack.

Proximity detection signals may be transmitted on reserved resources in various manners. In one design, proximity detection signals may be transmitted based on a random blanking scheme. In this design, in each PDS subframe, a device may either transmit a proximity detection signal with a probability of $P_{tx}$ or remain idle with a probability $1-P_{tx}$. If a transmission is to be sent in a given PDS subframe, then the device may randomly select one or more resource blocks from among all resource blocks reserved for peer discovery. The device may then transmit the proximity detection signal on the selected resource block(s). The transmission probability $P_{tx}$ may be a system parameter determined by a network entity (e.g., a base station) and may be broadcast to all devices and/or signaled to a device when it participates in peer discovery.

In another design, proximity detection signals may be transmitted based on a listen-and-pick scheme. In this design, resources reserved for peer discovery may be organized in PDS periods. Each PDS period may include one or more subframes, and each subframe may include a set of resource blocks available for peer discovery. The PDS periods may be spaced apart by $T_{PDS}$ ms. In a learning phase, a device may measure the received power of each resource block in each subframe available for peer discovery and may select a pair of subframe and resource block (or a {subframe, resource block} pair) with the lowest measured received power. The learning phase may occur over a particular time duration. In a dissemination phase, the device may transmit a proximity detection signal in the selected {subframe, resource block} pair in each PDS period. The device may remain silent in all other subframes in each PDS period. In one design, the available resources for peer discovery, the duration of the learning phase, and/or other parameters may be provided by a network entity when the device joins the peer discovery phase.

Proximity detection signals may also be transmitted based on other schemes. A device may implement an algorithm such that, in each subframe, the device either transmits a proximity detection signal on selected resources or remains idle. If the device is idle, then it may detect proximity detection signals from other devices on all available resources and may attempt to decode messages sent in the detected proximity detection signals.

Each device may be associated with a different message that can identify that device. A given device, U, may transmit a proximity detection signal comprising its message to enable other devices to detect device U. Device U may be detected by other devices that can reliably receive and decode the proximity detection signal from device U. Hence, a peer device can discover device U when the peer device can receive and decode the message transmitted by device U. In general, the detectability of each device may be dependent on the channel conditions between that device and each peer device. This may limit the range within which device U can be detected.

In one aspect, peer discovery may be performed with network coding to improve performance. For peer discovery with network coding, a device may generate a network-coded message based on a message assigned to the device and one or more messages received by the device from other devices. The device may then transmit a proximity detection signal comprising the network-coded message. The device may generate different network-coded messages based on different combinations of its own message and received messages in different PDS subframes. The device may thus transmit combinations of messages, instead of simply its own message, for peer discovery.

Network coding may improve detection of devices by other devices. A given device U may be assigned a message X and may transmit message X by itself or within network-coded messages to other devices. Devices that can decode the messages from device U may include and forward message X in network-coded messages transmitted by these devices. Message X for device U may thus be decoded by more devices through network-coded messages that include message X and are transmitted by other devices. Network coding may reduce the time needed to perform peer discovery and also reduce the amount of resources used for peer discovery.

Figure 3:
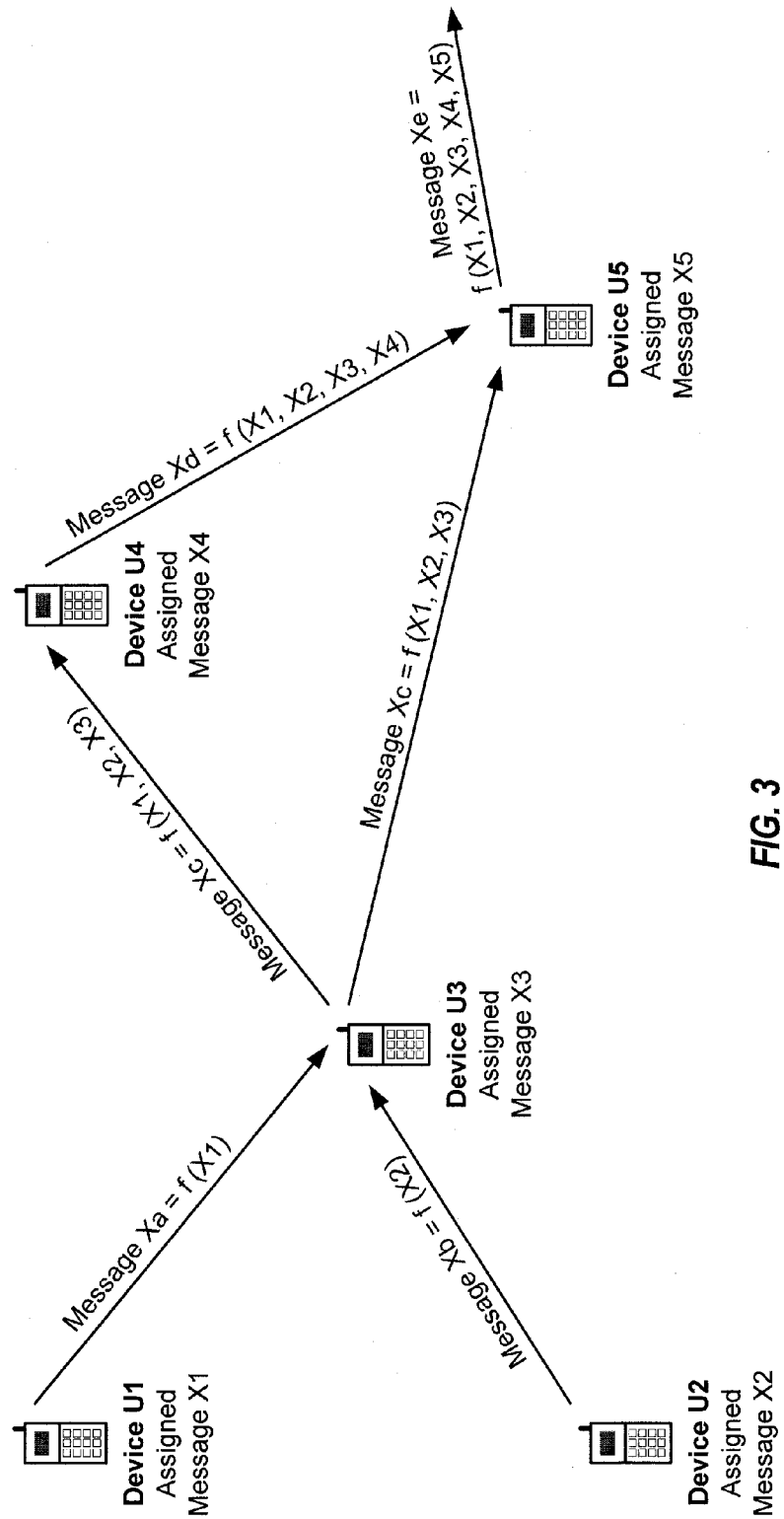
FIG. 3 shows an example of peer discovery with network coding.

FIG. 3 shows an example of peer discovery with network coding according to the present disclosure. In this example, five devices, U1-U5, are assigned five messages X1-X5, respectively. Device U1 may generate a message Xa based only on its message X1 and may transmit message Xa for peer discovery. Device U2 may generate a message Xb based only on its message X2 and may transmit message Xb for peer discovery. Device U3 may receive messages Xa and Xb from devices X1 and X2, respectively. Device U3 may generate a message Xc based on its message X3 and received messages Xa and Xb (which include messages X1 and X2) and may transmit message Xc for peer discovery. Device U4 may receive message Xc from device X3, generate a message Xd based on its message X4 and received message Xc (which includes messages X1, X2 and X3), and transmit message Xd for peer discovery. Device U5 may receive messages Xc and Xd from devices X3 and X4, respectively, generate a message Xe based on its message X5 and received messages Xc and Xd (which include messages X1, X2, X3 and X4), and transmit message Xe for peer discovery.

FIG. 3 shows exemplary transmissions of messages by five devices, U1-U5, within a particular time interval. Each device may generate and transmit different messages in different time intervals. Each device may transmit its own message separately in one or more time intervals to enable detection by other devices. For example, devices U3, U4 and U5 may periodically transmit their messages X3, X4 and X5, respectively, by themselves (and not in combination with other received messages at these devices). Each device may also forward messages of other devices to enable these other devices to be detect by more devices. For example, message X1 from device U1 may be forwarded by devices U3 and U4 in network-coded messages Xc and Xd, respectively, which may enable device U5 to decode message X1 and detect device U1.

In another aspect, peer discovery with network coding may be performed with network assistance. For network-assisted peer discovery with network coding, a device may register with a network for peer discovery and may be provided with at least one peer discovery parameter to use for peer discovery with network coding. The device may then perform peer discovery with network coding in accordance with the at least one peer discovery parameter.

Figure 4:
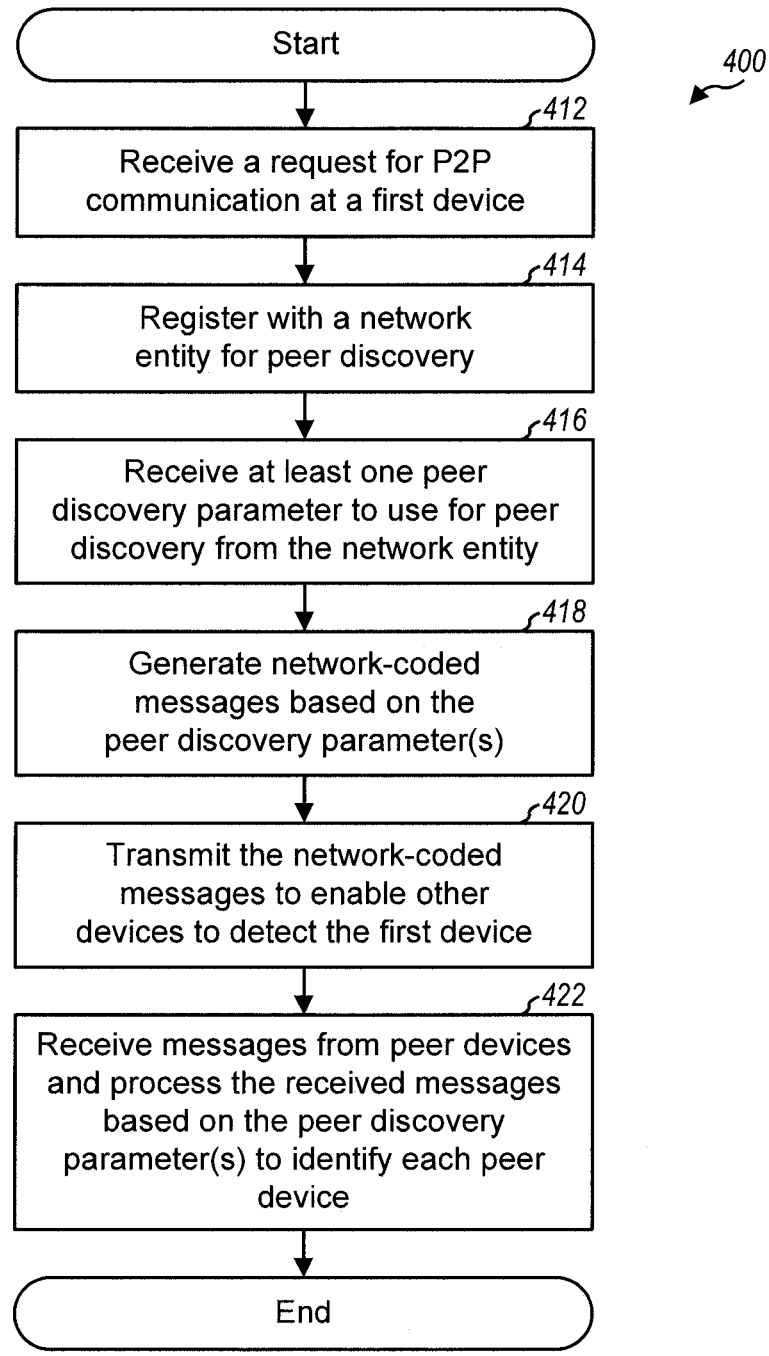
FIG. 4 shows a process for performing network-assisted peer discovery with network coding.

FIG. 4 shows a process 400 for performing network-assisted peer discovery with network coding. Process 400 may be performed by a device, which may be referred to as a first device is the description below for clarity.

The first device may receive a request for P2P communication (block 412). The request may come from an application executing on the first device, a network, etc. The request may also result from the first device being powered on, or from some other triggering event. The first device may initiate a peer discovery process in response to the request for P2P communication. The first device may register with a network entity for peer discovery (block 414). The network entity may be a base station, a network controller, an entity designated to assist peer discovery and/or P2P communication, etc. As part of registration, the first device may provide pertinent information such as its network address, the services requested and/or offered by the first device, its location, etc. The first device may receive at least one peer discovery parameter to use for peer discovery from the network entity (block 416). The peer discovery parameter(s) may relate to generation of network-coded messages for peer discovery, transmission of network-coded messages, resources available for transmission of network-coded messages, etc. The peer discovery parameter(s) may provide proper setup of various aspects of peer discovery with network coding. The peer discovery parameter(s) may be dependent on a particular network coding scheme used for peer discovery.

The first device may perform peer discovery with network coding in accordance with the peer discovery parameter(s) received from the network entity. The first device may generate network-coded messages based on the peer discovery parameter(s) (block 418). The first device may transmit the network-coded messages to enable other devices to detect the first device (block 420). The first device may transmit each network-coded message whenever an opportunity arises based on the random blanking scheme, the listen-and-pick scheme, or some other scheme. The first device may also receive messages from peer devices and may process the received messages based on the peer discovery parameter(s) to identify each peer device (block 422). Some of the steps in FIG. 4 are described in further detail below.

Messages used for peer discovery with network coding may be defined in various manners. In a first design, a single set of N unique messages may be defined and assigned to up to N devices for peer discovery. These unique messages may be referred to as base messages, original messages, information messages, etc. N may be any value and may be dependent on an expected maximum number of devices interested in P2P communication in a given geographic area. Each device may be assigned one base message in the set of base messages (e.g., during registration for peer discovery) and may be identified based on its assigned message. Each device may transmit its assigned message for peer discovery. Each device may also generate network-coded messages based on its assigned message and received messages and may transmit the network-coded messages for peer discovery. Each device may also detect peer devices based on messages received from the peer devices.

In the first design, N may be any value, and the single set of base messages may include any number of base messages. A large value of N may enable a base message for a given device to be forwarded by more devices in corresponding network-coded messages, which may enable the given device to be detected by more devices. However, a large value of N may also increase the amount of processing performed by each device on received messages to detect peer devices.

In a second design, to reduce computational complexity, the N base messages may be divided into W sets, with each set including K base messages, where N=W*K. A "generation" may refer to a set of base messages that can be assigned to different devices and combined to generate network-coded messages. Hence, W generations may be defined for the W sets of base messages. Each of the N base messages may belong to a single generation and may be assigned a specific position/index within that generation. In one example, the size of a generation (K) may be fixed and known a priori by all devices. In another example, the generation size may be a system parameter and may be signaled to the devices, e.g., during registration for peer discovery. A device may be assigned a specific base message in a specific generation during registration for peer discovery. In this case, the at least one peer discovery parameter provided to the device during registration may include an ID of the generation assigned to the device and an index of the base message assigned to the device. The index indicates the position of the assigned message within the generation. The device may be discovered by (or known to) other devices based on the position of its assigned message in its assigned generation. The device may also be assigned a 'dummy' generation if the device does not want to take part in network-coded peer discovery, e.g., due to complexity, battery constraints, or some other reason.

In one design, each of the N base messages may be represented as a vector of L symbols, where L is the message length and may be any integer value. In one design, each symbol of a message may be an element of a Galois field of size Q, or GF(Q), where Q may be 2 or some other value. For example, each symbol may have a value of 0 or 1 for GF(2) or may have a value within a range of 0 to Q−1 for GF(Q).

A set of W information matrices $X_1, X_2, \ldots, X_W$ may be defined for the W generations, one information matrix for each generation. Each information matrix $X_i$ has a dimension of K×L and includes K rows for the K base messages belonging to generation i, where i is an index of the W generations and i∈{1, . . . , W}. Each row of information matrix $X_i$ corresponds to one base message of L symbols in, generation i. An objective of peer discovery may be to enable each device to retrieve all of the information matrices.

A device may store an encoding matrix $G_i$ and a received matrix $Y_i$ for each generation i. The entries of matrices $G_i$ and $Y_i$ are elements of Galois field GF(Q). Matrices $G_i$ and $Y_i$ may be defined as follows:

$$Y_i = G_i X_i, \text{ for } i=1, \ldots, W, \quad \text{Eq (1)}$$

where $X_i$ is a K×L information matrix for generation i,
$G_i$ is a M×K encoding matrix for generation i, and
$Y_i$ is a M×L received matrix for generation i.

Received matrix $Y_i$ includes M rows for M messages received by the device for generation i, one row for each received message, where 0≤M≤K. Matrix $Y_i$ and row count M for generation i may be updated whenever a new message is received by the device for generation i. M may be different for different generations and may be dependent on the number of received messages for each generation. Initially, received matrix $Y_i$ for each generation may be empty, except for the received matrix for the generation to which the device belongs. In particular, the device may be assigned a base message in generation u, where u∈{1, . . . , W}. The first row of received matrix $Y_u$ may include the base message assigned to the device.

Encoding matrix $G_i$ includes M rows for M encoding vectors corresponding to M received messages for generation i, one row for each encoding vector. Each encoding vector indicates a specific combination of up to K base messages used to generate one received message. Encoding matrix $G_i$ for generation i may be updated whenever a new message is received by the device for generation i. Initially, encoding matrix $G_i$ for each generation may be empty, except for the encoding matrix for generation u to which the device belongs. In particular, the first row of encoding matrix $G_u$ may include an encoding vector for the base message assigned to the device. This encoding vector may include (i) a non-null element in GF(Q) at a position corresponding to an index of the base message assigned to the device within generation u and (ii) K−1 null elements at remaining positions in the encoding vector. For example, if the device is assigned a base message with index v in generation u, then the first row of encoding matrix $G_u$ (and hence the encoding vector for the assigned message) may include a non-null element at the v-th position and null elements at remaining positions.

Figure 5:
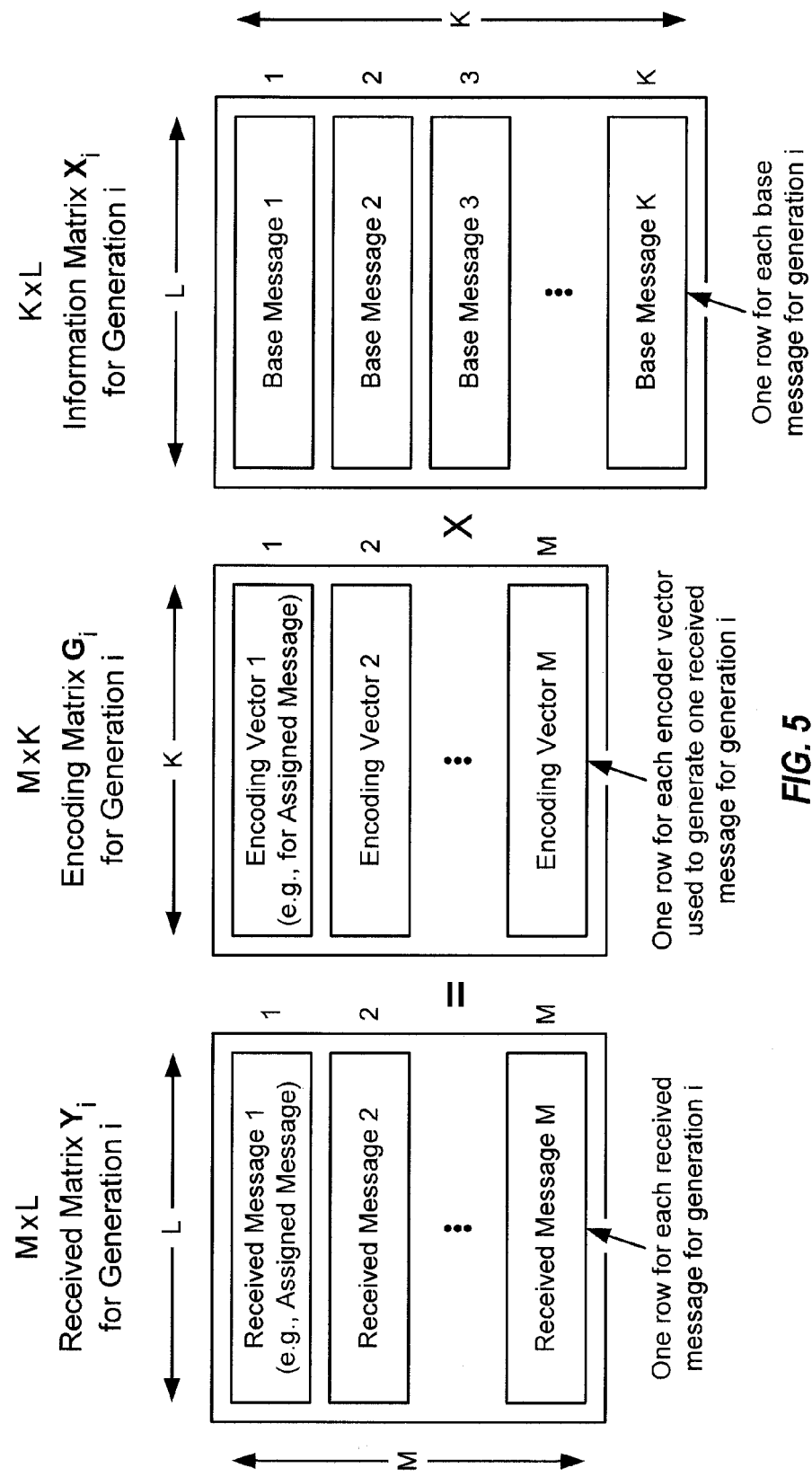
FIG. 5 graphically illustrates various matrices for peer discovery.

FIG. 5 graphically illustrates information matrix $X_i$, encoding matrix $G_i$, and received matrix $Y_i$ for one generation i. Information matrix $X_i$ includes K rows for K base messages for generation i. Received matrix $Y_i$ includes M rows for M received messages for generation i. Encoding matrix $G_i$ includes M rows for M encoding vectors used to generate the M received messages in received matrix $Y_i$.

A given device, U, may perform peer discovery with network coding as follows. Device U may be assigned a base message X in generation u. Message X may have an index of v and may be the v-th base message in the set of K base messages for generation u.

Initially, device U may transmit its assigned message X in a proximity detection signal for peer discovery. The proximity detection signal may also include (i) the ID of the generation to which message X belongs (which is u) and (ii) an encoding vector for message X. This encoding vector may include (i) a non-null element at position v corresponding to the position of message X within generation u and (ii) K−1 null elements at the remaining positions. Device U may generate a payload comprising message X, the generation ID, the encoding vector, and possibly other information. Device U may encode the payload, generate the proximity detection signal based on the encoded payload, and transmit the proximity detection signal. Other devices may receive the proximity detection signal from device U. Devices with sufficiently good received signal quality for device U may be able to decode the payload, determine that message X is not combined with other messages based on the encoding vector, and detect device U based on message X. These devices may forward message X in their network-coded messages.

Device U may listen for proximity detection signals from other devices and may decode the payload of each detected proximity detection signal. Device U may process a decoded payload for a detected proximity detection signal as follows. Device U may extract a received message, a generation ID, and an encoding vector from the decoded payload. The received message may be denoted as received message R. The generation ID indicates the generation to which the received message belongs, which may be generation j.

Device U may determine whether received message R can increase the rank of encoding matrix $G_j$ maintained by device U for generation j. For example, the rank of encoding matrix $G_j$ can be increased if received message R is generated with a base message in information matrix $x_j$ that is not used in any message received by device U for generation j. This may be determined by comparing the encoding vector for received message R with the encoding vectors for the other messages received by device U for generation j. For example, device U may append the encoding vector for received message R to encoding matrix $G_j$ and may determine whether the number of columns with at least one non-null element increases due to the encoding vector for received message R being appended to encoding matrix $G_j$.

If the rank of encoding matrix $G_j$ can be increased, then device U may consider received message R as an innovative message, may mark generation j as innovative, and may update encoding matrix $G_j$ and received matrix $Y_j$ based on received message R. In particular, device U may store received message R as a new row of received matrix $Y_j$ and may also store the encoding vector for received message R as a new row of encoding matrix $G_j$. The received message may be discarded if it does not increase the rank of the encoding matrix.

Device U may transmit its assigned message X or a network-coded message at each opportunity to transmit a proximity detection signal. In one design, device U may transmit a network-coded message if at least one generation is marked as innovative and may transmit its assigned message X otherwise. If several generations are marked as innovative, then device U may select one generation, e.g., randomly or in a predetermined order. The selected generation may be generation j.

In one design, device U may generate a network-coded message for generation j as follows. Device U may draw M random coefficients from Galois field GF(Q) and may form a coefficient vector with the M coefficients, where M is the number of rows of received matrix $Y_j$ for generation j. Device U may then generate a network-coded message and a corresponding encoding vector based on the coefficient vector, as follows:

$$m = cY_j, \text{ and} \qquad \text{Eq (2)}$$

$$g = cG_j, \qquad \text{Eq (3)}$$

where c is a 1×M coefficient vector with M coefficients, m is a 1×L message vector for the network-coded message, and g is a 1×K encoding vector for the network-coded message.

Device U may also generate a network-coded message based on its assigned message and received messages in other manners. Device U may generate a payload comprising the network-coded message (which is message vector m), the encoding vector for the network-coded message (which is encoding vector g), the generation ID for the network-coded message (which is j), and possibly other information. Device U may generate a proximity detection signal based on the payload and may transmit the proximity detection signal.

Device U may attempt to identify peer devices whenever a message is received by device U. For example, device U may obtain received message R for generation j and may update received matrix $Y_j$ and encoding matrix $G_j$ based on received message R and the encoding vector for received message R, as described above. Device U may then determine whether the rank of encoding matrix $G_j$ is full.

If the rank of encoding matrix $G_j$ for generation j is full, then device U may recover the K base messages for generation j by solving the set of linear equations $Y_j = G_j X_j$ for the entries of matrix $X_j$, e.g., via Gaussian elimination. Device U may obtain K base messages for generation j from solving the set of linear equations, Device U may identify K peer devices based on the K base messages.

If the rank of encoding matrix $G_j$ for generation j is not full, then device U may perform Gaussian elimination on a system of linear equations in $Y_j = G_j X_j$. Depending on how the received messages in matrix $Y_j$ were generated, as indicated by the encoding vectors in matrix $G_j$ for these received messages, device U may be able to retrieve zero or more base messages for generation j based on the system of linear equations.

Various mechanisms may be used to prevent deadlocks and to accelerate peer discovery. In one design, device U may limit transmission of network-coded messages. Device U may transmit a network-coded message for each generation marked as innovative. If device U has transmitted network-coded messages for all generations marked as innovative, then device U may move to an idle state. In the idle state, device U may avoid transmitting a proximity detection signal even if such an opportunity arises. Device U may move from the idle state to an active state whenever an innovative message is received for any generation. Device U may transmit a network-coded message for each generation marked as innovative and may then return to the idle state. If device U has remained in the idle state for a time period longer than $T_{max}$, then device U may return to the active state even if no generation is marked as innovative. Device U may then select one generation (e.g., randomly or in a predetermined order), generate a network-coded message for the selected generation, transmit the network-coded message, and then return to the idle state.

In one design, $T_{max}$ may be a fixed value that is known a priori by all devices. In another design, $T_{max}$ may be a configurable value that may be conveyed to devices. For example, if a new device joins the network, then $T_{max}$ may be set to a low value to trigger existing devices to move out of the idle state to speed-up discovery of the new device by existing devices as well as discovery of the existing devices by the new device.

In one design, the range of peer discovery with network coding may be restricted in order to reduce complexity. Device U may be detected by peer devices located farther away if its assigned message X is sequentially forwarded by more devices. The number of hops observed by message X is equal to the number of devices sequentially forwarding message X. For example, in the example shown in FIG. 3, message X1 assigned to device U1 is sequentially forwarded by two devices U3 and U5 and hence observes two hops.

A device U may discover peer devices that are up to $h_{max}$ hops away from device U and may be discovered by other devices that are up to $h_{max}$ hops away, where $h_{max}$ may be any suitable value. This constraint may be referred to as a max-Hop constraint. In this design, the network can limit the extent of peer discovery by specifying a maximum "separation" of devices, which may be given by a maximum number of hops, beyond which peer discovery with network coding will not be supported.

Limiting the number of hops may be achieved as follows. Device U may store a hop matrix $H_i$ for each generation i. Hop matrix $H_i$ for generation i may include one row for each received message for generation i. Each row of $H_i$ may include K elements indicative of the number of hops for up to K base messages used to generate the received message corresponding to that row. At the start of peer discovery, hop matrix $H_i$ for each generation may be empty, except for the hop matrix for generation u to which device U belongs. In particular, the first row of hop matrix $H_u$ may include (i) a null element at the position corresponding to the position of message X assigned to device U within generation u and (ii) K−1 elements set to infinity (INFTY) at remaining positions in the hop matrix.

In one design, device U may determine a hop vector of K elements for an output message to be transmitted, as described below. The output message may be the base message X assigned to device U or a network-coded message generated by device U. Device U may send the hop vector along with the output message, the encoding vector, and the generation ID. The hop vector for assigned message X may include one null element and K−1 elements set to INFTY, as described above.

Device U may receive an innovative message for generation j and may extract the hop vector sent with the received message. Device U may increment each element of the hop vector by one (where INFTY+1=INFTY) and may add the updated hop vector as a new row of hop matrix $H_j$ for generation j.

Device U may generate a network-coded message for generation j with a restriction on the number of hops as follows. K column vectors for the K columns of encoding matrix $G_j$ for generation j may be denoted as $g_{j,1}$ through $g_{j,K}$, with each column vector having a dimension of M×1, where M is the number of rows of $G_j$. K column vectors for the K columns of hop matrix $H_j$ for generation j may be denoted as $h_{j,1}$ through $h_{j,K}$, with each column vector having a dimension of M×1. The M entries of column vector $h_{j,i}$, for i∈{1, ..., K}, indicate the number of hops observed by the i-th base message in the M received messages for generation j.

Device U may identify a set of indexes (denoted as set I) such that min $\{h_{j,i}\}<h_{max}$, where INFTY>$h_{max}$, and the "min" operation is over all entries of column vector $h_{j,i}$. Set I may include the indices of all column vectors of $H_j$ for which the condition min $\{h_{j,i}\}$I<$h_{max}$ is satisfied. Device U may determine a 1×M coefficient vector c with coefficients selected from Galois field GF(Q) such that $cg_{j,i}=0$ for each index i not in set I. Set I may indicate all base messages that can be forwarded without violating the maxHop constraint. This may ensure that base messages not received by device U as well as base messages with hop count greater than $h_{max}$ are not used to generate a network-coded message.

Device U may compute a network-coded message (or a message vector m) and an encoding vector g based on coefficient vector c, as shown in equations (2) and (3). To satisfy the maxHop constraint, coefficient vector c should be chosen such that the resulting encoding vector g has zero entries $g_i$ for every index i not included in set I. Device U may also determine a hop vector h for the network-coded message by selecting min $\{h_{j,i}\}$, for i=1, ..., K. The i-th position of the hop vector h may be set to the minimum hop count in the i-th column of $H_j$. This may ensure that the base message assigned to each device can be forwarded by the greatest number of peer devices. For example, referring to the example shown in FIG. 3, device U5 may set the number of hops for message X1 assigned to device U1 to two hops based on message Xc received from device X3 (instead of to three hops based on message Xd received from device X4).

The scheme described above for limiting the number of hops observed by each base message may ensure that device U will forward network-coded messages containing only base messages that device U has received from less than $h_{max}$ hops away from device U. If set I is empty, meaning that no base message in generation j observes less than $h_{max}$ hops, then device U may refrain from generating a network-coded message based on any message in generation j.

Device U may perform peer discovery for some period of time and may depart the peer discovery procedure for various reasons. For example, device U may leave the network, or may be powered down, or may be directed by the network or an application running on the device to cease P2P communication, etc. In one design, device U may perform de-registration for peer discovery and may inform the network entity with which device U has registered for peer discovery that device U is leaving the network. The departure of device U may be addressed in various manners.

In one design, which may be referred to as a centralized design for termination of peer discovery, the network entity may broadcast notification information indicating the generation ID u of departed device U and the index v of base message X assigned to device U within generation u. Other devices may receive the notification information and may update their encoding matrices and received matrices based on the notification information. In particular, a peer device may remove from its encoding matrix $G_u$ and received matrix $Y_u$ all rows whose v-th element is non-null. This would prevent the peer device from retrieving and using message X of departed device U as well as from forwarding stale information including message X to other devices in the network. The network entity may thereafter assign message X in generation u (or the {u, v} pair) to a new device that registers with the network entity for peer discovery.

In another design, which may be referred to as a decentralized design for termination of peer discovery, timestamps may be used to discard stale information. All devices may share a common time reference t, which may be provided by the network entity. For example, the network entity may initialize a timer prior to the start of the peer discovery procedure and may provide each device with the current value of the timer at the time of registration for peer discovery. The network entity may also provide a timestamp threshold $\Delta T_{max}$ to all devices.

Device U may store a timestamp vector $t_i$ for each generation i. Timestamp vector $t_i$ for generation i may include one entry for each received message for generation i. Each entry of vector $t_i$ may indicate the timestamp of the received message corresponding to that entry. The timestamp of a received message may be the minimum of the timestamps of all base messages used to generate this received message. At the start of peer discovery, timestamp vector $t_i$ for each generation may be set to empty, except for the timestamp vector for generation u to which device U belongs. In particular, the v-th element of timestamp vector $t_u$ may include (i) an element set to INFTY in the v-th position corresponding to the position of message X assigned to device U within generation u and (ii) K−1 null elements in the remaining positions in the timestamp vector.

Device U may send a timestamp along with an output message transmitted by device U. The timestamp of an output message comprising only message X assigned to device U may be set to the current value of t.

Device U may receive an innovative message for generation j and may extract the timestamp sent with the received message. Device U may store the received timestamp as a new element of timestamp vector $t_j$ for generation j. Device U may generate a network-coded message for generation j and may set the timestamp of this message to min $\{t_j\}$. The timestamp for the network-coded message would then be the earliest timestamp of all received messages for generation j.

Periodically, device U may check the timestamp vectors for all generations. If the timestamp in position k of timestamp vectors $t_j$ is earlier than the current value of t by more than $\Delta T_{max}$, then device U may remove the k-th row of encoding matrix $G_j$ as well as the k-th row of received matrix $Y_j$.

Device U may inform the network entity that it is leaving the network. The network entity may wait at least $\Delta T_{max}$ seconds after device U has left the network and may then assign message X in generation u (or the pair $\{u, v\}$) to a new device that registers for peer discovery. Waiting at least $\Delta T_{max}$ seconds may ensure that all devices have removed message X from their encoding matrices and received matrices.

Network assistance may be used for various aspects of peer discovery with network coding. In one aspect, the network entity may determine the size of the W generations and/or allocate the generations such that good performance may be obtained for peer discovery. In another aspect, a generation may be allocated to a particular geographic area and may be location specific. For example, a cluster of base stations that are geographically co-located may be allocated the same set of one or more generations, and these base stations may assign the base messages in the one or more generations to their devices. The generation size may be selected based on overhead and/or other considerations. In general, a smaller generation size may reduce overhead and complexity whereas a larger generation size may increase the total number of peer devices that can be discovered.

Some resources may be reserved for peer discovery and may be conveyed to devices. Resources may be reserved for peer discovery in various manners. In one design, separate resources may be reserved for peer discovery with and without network coding. For example, a first set of resources may be reserved for peer discovery with network coding, and a second set of resources may be reserved for peer discovery without network coding. In this design, devices may transmit their assigned messages and/or network-coded messages on the first set of resources when performing peer discovery with network coding. Devices may transmit only their assigned messages on the second set of resources when performing peer discovery without network coding. In another design, common resources may be reserved for peer discovery with and without network coding.

Transmission of network-coded messages may be constrained in order to reduce complexity and achieve good performance. In one design, a constraint may be given by a maximum number of network-coded messages that can be transmitted for every non-network coded message (or assigned message) that is transmitted. The constraint may be probabilistic and specified as follows. The number of base messages in an information matrix used to generate a network-coded message may be denoted as k, where 1<k≤K. The network-coded message may be considered as having a weight of k whereas a non-network coded message may have a weight of 1. The probability of transmitting a network-coded message of weight k may be denoted as $P_k$. Transmission of network-coded messages may be constrained based on a probability distribution $\{P_k\}$, for k=1, . . . , K. Hence, network-coded messages of weight k may be transmitted with a probability of $P_k$ or lower. In one design, progressively lower probability may be assigned to progressively higher weight (or progressively more base messages used to generate a network-coded message).

A constraint may also be given by the resources on which network-coded messages may be transmitted. For example, separate resources may be reserved for network-coded messages of different weights. A network-coded message of weight k may be transmitted on resources reserved for weight k.

The techniques described herein may provide various advantages. First, the techniques may enable detection of peer devices located farther away by allowing messages assigned to these devices to be forwarded via network coding. The techniques may also enable detection of devices in a shorter period of time and/or with less resources. The techniques may be used with various orthogonal multiplexing schemes such as OFDMA, SC-FDMA, CDMA, FDMA, TDMA, etc.

Figures 6, 7:
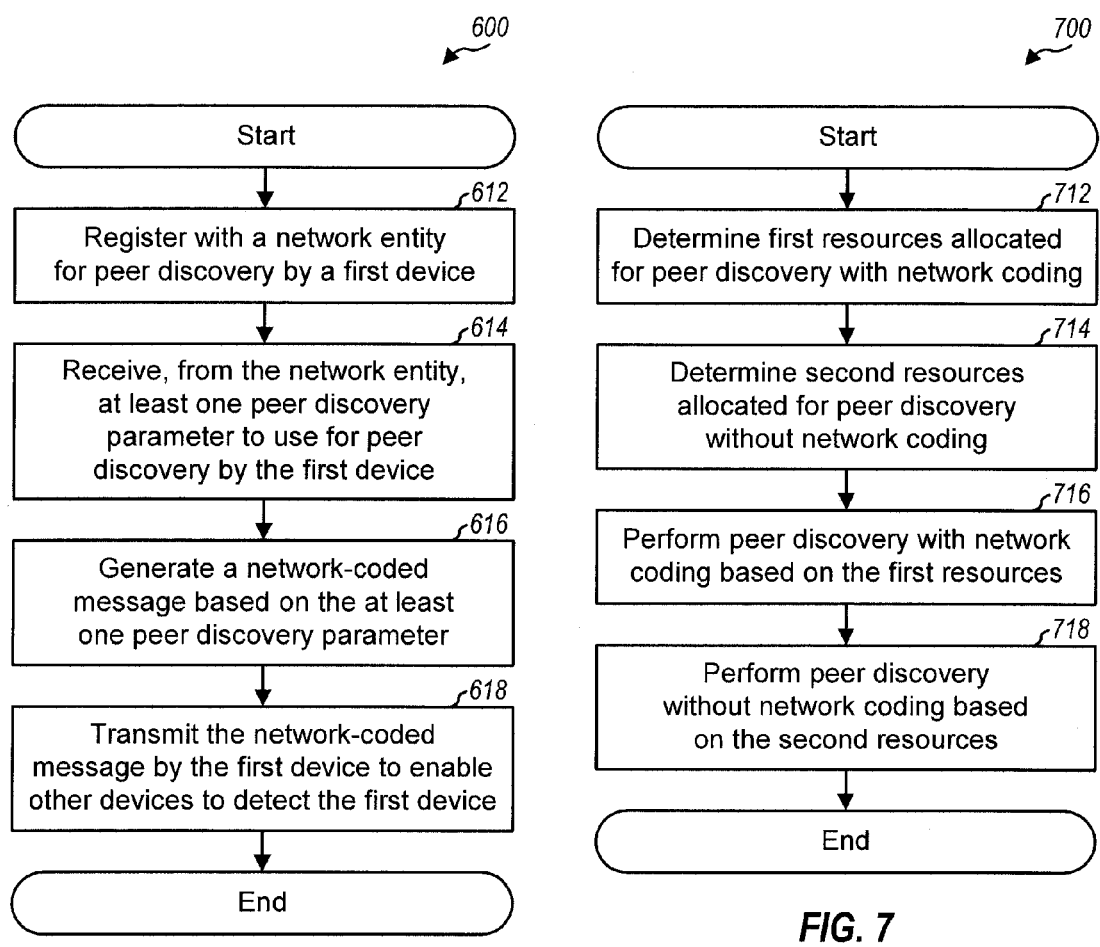
FIG. 6 shows a process for performing network-assisted peer discovery with network coding.
FIG. 7 shows a process for performing peer discovery with and without network coding.

FIG. 6 shows a design of a process 600 for performing network-assisted peer discovery with network coding. Process 600 may be performed by a first device (as described below) or by some other entity. The first device may register with a network entity for peer discovery (block 612). The network entity may be a base station, a network controller, or some other entity designated to support peer discovery. The first device may receive, from the network entity, at least one peer discovery parameter to use for peer discovery (block 614). The first device may generate a network-coded message based on the at least one peer discovery parameter (block 616). The first device may transmit the network-coded message to enable other devices to detect the first device (block 618).

In one example, the at least one peer discovery parameter may comprise an index of a message assigned to the first device in a set of messages available for peer discovery. In another example, the at least one peer discovery parameter may comprise an identity of a generation selected for the first device from among a plurality of generations. Each generation may be associated with a different set of messages that can be combined for network coding. The at least one peer discovery parameter may farther comprise an index of a message assigned to the first device in the set of messages associated with the generation selected for the first device. The message index may be unique to the first device in the selected generation. A group of devices may be assigned different indices for the set of messages associated with the selected generation. The at least one peer discovery parameter may further comprise the size of the selected generation (or the number of messages in the associated set of messages).

The at least one peer discovery parameter may comprise other information. In one design, the at least one peer discovery parameter may comprise a maximum number of hops allowed for messages forwarded in network-coded messages. In another design, the at least one peer discovery parameter may comprise an age limit of messages forwarded in network-coded messages. The age limit may be determined based on the current time maintained by the first device and a delta $\Delta T_{max}$, which may be conveyed via the at least one peer discovery parameter.

The at least one peer discovery parameter may comprise a limit on the number of network-coded messages that can be transmitted by the first device. Alternatively or additionally, the at least one peer discovery parameter may comprise a limit on the number of network-coded messages that can be transmitted by the first device for each of a plurality of weights. Each weight may correspond to a different number of messages that are combined to generate a network-coded message.

In one design of block 616, the first device may form a message matrix based on a plurality of messages, which may include the message assigned to the first device by the network entity and at least one message received by the first device from at least one peer device, e.g., as shown in FIG. 5. The first device may generate the network-coded message based on a linear combination of the plurality of messages in the message matrix.

In one design, the first device may form an encoding matrix comprising a plurality of encoding vectors corresponding to the plurality of messages in the message matrix, one encoding vector for each message in the message matrix, e.g., as shown in FIG. 5. Each encoding vector may identify at least one message used to generate a corresponding message in the message matrix. The first device may generate an encoding vector for the network-coded message based on a linear combination of the plurality of encoding vectors in the encoding matrix.

In one design, the first device may select (e.g., randomly) a vector of coefficients. The first device may generate the encoding vector based on the encoding matrix and the vector of coefficients, e.g., as shown in equation (3). The first device may generate the network-coded message based on the message matrix and the vector of coefficients, e.g., as shown in equation (2). In one design, the first device may detect messages from peer devices based on the message matrix and the encoding matrix.

In one design, the first device may obtain a received message from a second device and may determine whether the received message is an innovative message comprising at least one message not yet received by the first device. The first device may generate the network-coded message in block 616 in response to at least one innovative message being present at the first device.

In one design, the first device may transition to an idle state if no innovative messages are present at the first device and may skip transmission of messages for peer discovery while in the idle state. The first device may transition to an active state when an innovative message is received or when a predetermined time period has elapsed since the first device transitions to the idle state. The first device may transmit at least one message for peer discovery while in the active state.

FIG. 7 shows a design of a process 700 for performing peer discovery with and without network coding. Process 700 may be performed by a first device (as described below) or by some other entity. The first device may determine first resources allocated for peer discovery with network coding (block 712). The first device may also determine second resources allocated for peer discovery without network coding (block 714). The first and second resources may comprise time-frequency resources, code resources, etc. In one design, the first device may receive information indicative of the first and second resources from a network entity. The first device may also determine third resources allocated for uplink communication with the network entity. The third resources may be in the same frequency band as the first and second resources.

The first device may perform peer discovery with network coding based on the first resources (block 716). In one design, the first device may generate a network-coded message based on a message assigned to the first device and at least one message received by the first device. The first device may transmit the network-coded message based on the first resources to enable other devices to detect the first device.

The first device may perform peer discovery without network coding based on the second resources (block 718). In one design, the first device may determine the message assigned to the first device for peer discovery. The first device may transmit this message, without any network coding, based on the second resources to enable other devices to detect the first device.

Figures 8, 9:
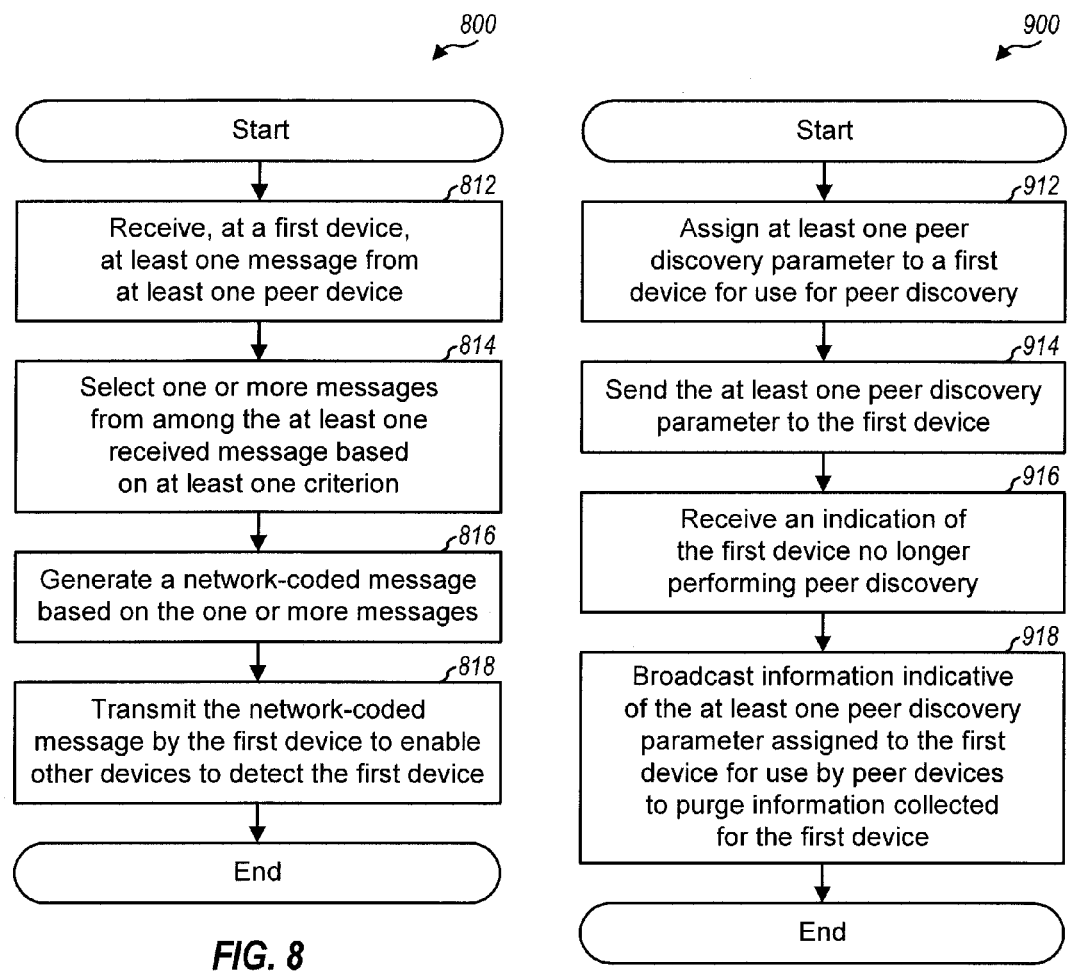
FIG. 8 shows a process for performing peer discovery with network coding.
FIG. 9 shows a process for supporting peer discovery.

FIG. 8 shows a design of a process 800 for performing peer discovery with network coding. Process 800 may be performed by a first device (as described below) or by some other entity. The first device may receive at least one message from at least one peer device (block 812). The first device may select one or more messages from among the at least one received message based on at least one criterion (block 814). The first device may generate a network-coded message based on the one or more messages (block 816). The first device may transmit the network-coded message to enable other devices to detect the first device (block 818).

In one design, the at least one criterion may comprise a criterion related a number of hops. The first device may determine the number of hops associated with each of the at least one received message. The first device may select the one or more messages, with each message being associated with a maximum number of hops or fewer. In one design, the first device may determine a hop vector based on the number of hops associated with each of the one or more messages. The first device may send the hop vector with the network-coded message.

In another design, the at least one criterion may comprise a criterion related to a timestamp. The first device may determine a timestamp of each of the at least one received message. The first device may select the one or more messages, with each message being associated with a timestamp that is more recent than an age limit. The first device may determine the age limit based on the current time and a delta $\Delta T_{max}$. The delta may be broadcast by a network or provided to the first device, e.g., during registration with the network for peer discovery. The first device may determine a timestamp of the network-coded message based on the timestamp of each of the one or more messages. The first device may send the timestamp of the network-coded message with the network-coded message. The first device may discard each received message associated with a timestamp that is older than the age limit.

FIG. 9 shows a design of a process 900 for supporting peer discovery. Process 900 may be performed by a network entity (as described below) or by some other entity. The network entity may assign at least one peer discovery parameter to a first device for use for peer discovery (block 912). The network entity may send the at least one peer discovery parameter to the first device (block 914). The network entity may thereafter receive an indication of the first device no longer performing peer discovery (block 916). The network entity may broadcast information indicative of the at least one peer discovery parameter assigned to the first device for use by peer devices to purge information collected for the first device (block 918).

In one design, the at least one peer discovery parameter may comprise an index of a message assigned to the first device in a set of messages available for peer discovery. In another design, the at least one peer discovery parameter may comprise (i) an identity of a generation selected for the first device and (ii) an index of a message assigned to the first device in a set of messages associated with the selected generation.

In one design, each peer device may be associated with an encoding matrix and a message matrix used by that peer device to generate messages to transmit for peer discovery. The information broadcast by the network entity may be used to reset entries in the encoding matrix and the message matrix corresponding to the first device.

Figure 10:
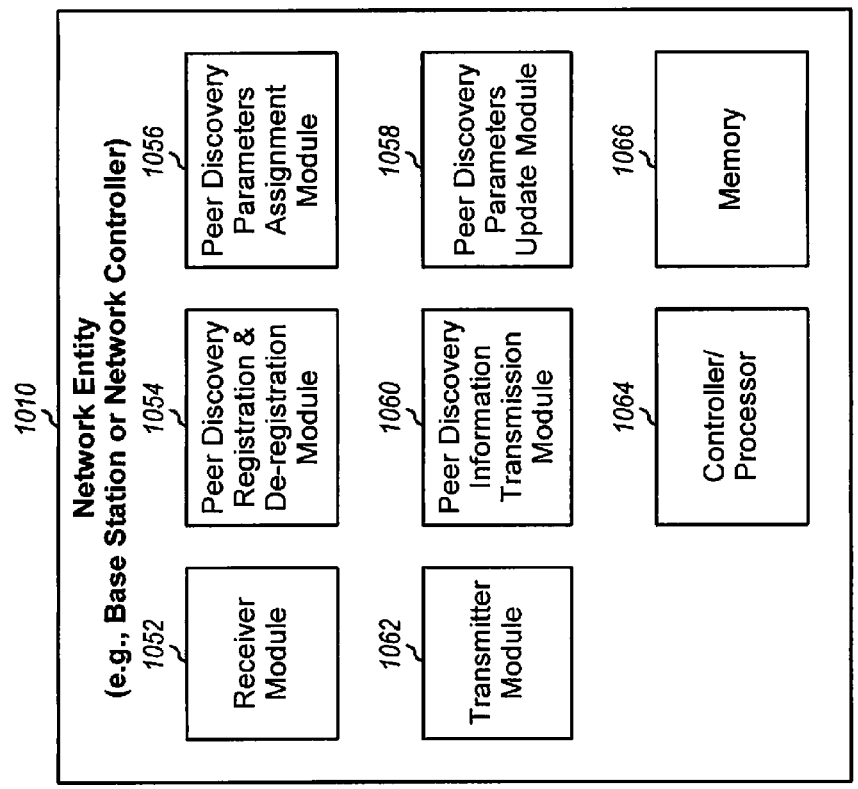
FIG. 10 shows a block diagram of a network entity and a device.
Figure 10:
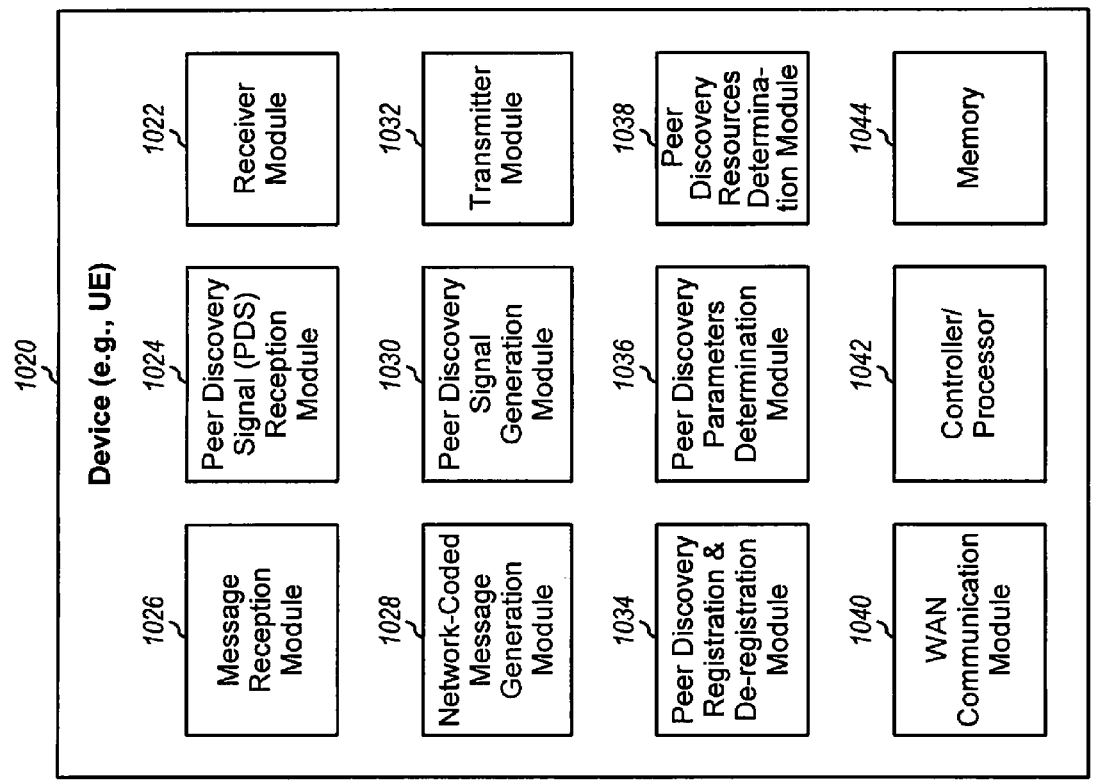

FIG. 10 shows a block diagram of a design of a network entity 1010 (e.g., a base station or a network controller) and a device 1020 (e.g., a UE). Within device 1020, a receiver module 1022 may receive proximity detection signals from other devices, downlink signals from base stations, etc. A module 1024 may detect and process the proximity detection signals received from other devices and may provide messages sent in these proximity detection signals. A module 1026 may process the received messages, determine whether each received message is innovative, and update a received matrix and an encoding matrix for each innovative message. A module 1028 may generate a network-coded message whenever there is an opportunity to transmit such a message. A module 1030 may generate a proximity detection signal comprising a message assigned to device 1020 or a network-coded message generated by module 1028. A transmitter module 1032 may transmit the proximity detection signal from module 1030. A module 1034 may perform registration for peer discovery with a designated network entity. Module 1034 may also perform de-registration when device 1020 no longer desires to participate in peer discovery. A module 1036 may determine at least one parameter to use for peer discovery based on registration with the designated network entity, broadcast messages sent by the network, unicast messages sent to device 1020, etc. The at least one peer discovery parameter may include a message index and possibly a generation ID assigned to device 1020, a maximum number of hops, a delta for age limit, etc. A module 1038 may determine resources to use for peer discovery from registration for peer discovery, broadcast messages, unicast messages, etc. The resources for peer discovery may comprise time-frequency resources, code resources, etc. A module 1040 may support WAN communication and may process downlink signals received from base stations and generate uplink signals for transmission to base stations. A controller/processor 1042 may direct the operation of various modules within device 1020. A memory 1044 may store data and program codes for device 1020.

Within network entity 1010, a receiver module 1052 may receive signals from devices, which may include requests for registration for peer discovery, notices of termination of peer discovery, etc. A module 1054 may perform registration of devices for peer discovery. Module 1054 may also perform de-registration of devices that no longer desire to participate in peer discovery. A module 1056 may assign parameters for peer discovery to devices. A module 1058 may update parameters for peer discovery when devices perform registration or de-registration, when a network makes changes to peer discovery, etc. A module 1060 may send information (e.g., parameters) for peer discovery to devices. A transmitter module 1062 may generate and send a signal comprising the information for peer discovery. A controller/processor 1064 may direct the operation of various modules within network entity 1010. A memory 1066 may store data and program codes for network entity 1010.

The modules in FIG. 10 may comprise processors, electronic devices, hardware devices, electronic components, logical circuits, memories, software codes, firmware codes, etc., or any combination thereof.

Figure 11:
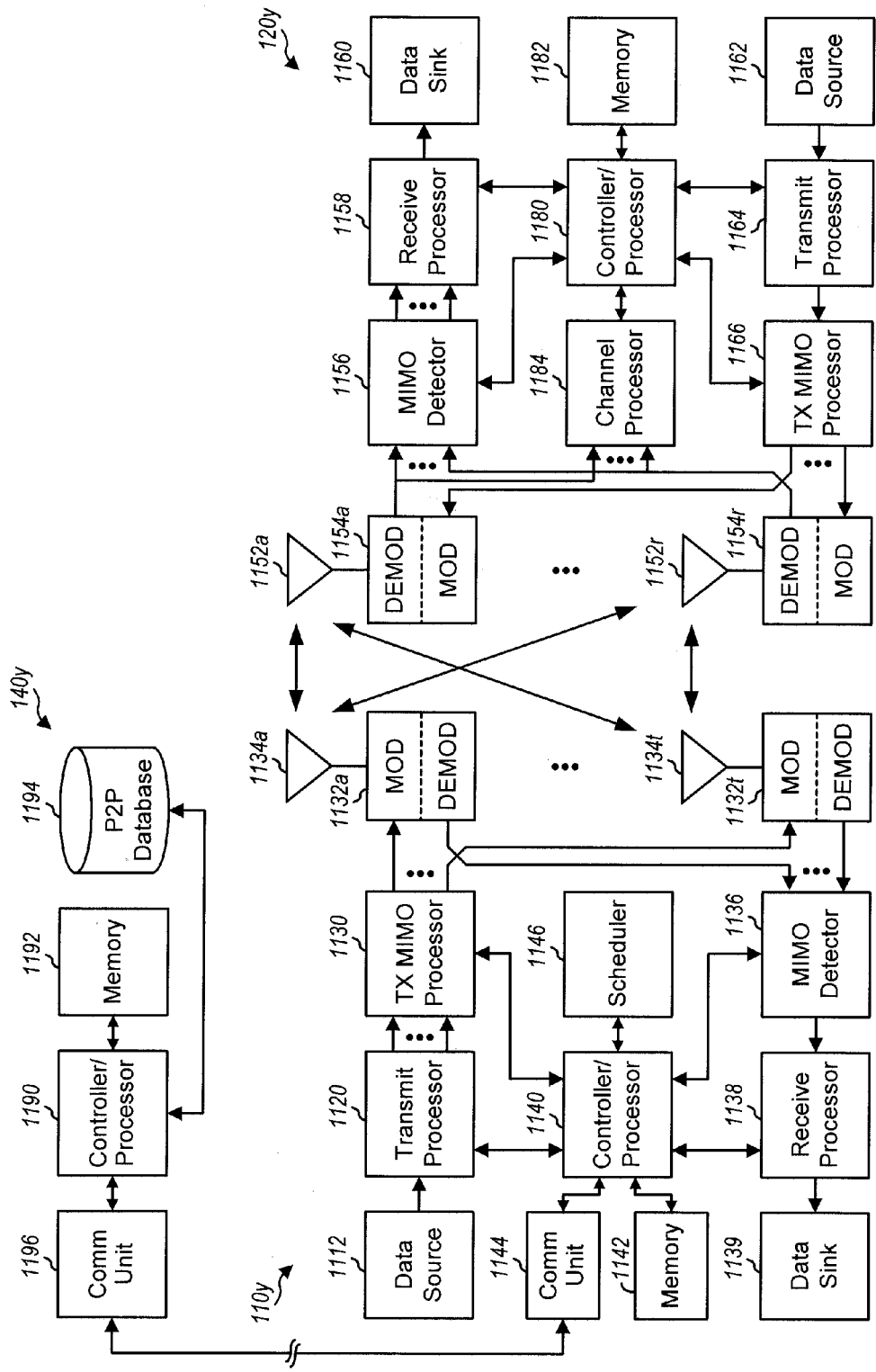
FIG. 11 shows a block diagram of a base station, a device, and a network entity.

FIG. 11 shows a block diagram of a base station 110y, a device 120y, and a network entity 140y. Base station 110y may be equipped with T antennas 1134a through 1134t, and device 120y may be equipped with R antennas 1152a through 1152r, where in general T≥1 and R≥1.

At base station 110y, a transmit processor 1120 may receive data from a data source 1112 and control information (e.g., messages for peer discovery) from a controller/processor 1140. Processor 1120 may process (e.g., encode and modulate) the data and control information to obtain data symbols and control symbols, respectively. Processor 1120 may also generate reference symbols for synchronization signals, reference signals, etc. A transmit (TX) multiple-input multiple-output (MIMO) processor 1130 may perform spatial processing (e.g., precoding) on the data symbols, the control symbols, and/or the reference symbols, if applicable, and may provide T output symbol streams to T modulators (MODs) 1132a through 1132t. Each modulator 1132 may process a respective output symbol stream (e.g., for OFDM, SC-FDMA, CDMA, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At device 120y, antennas 1152a through 1152r may receive the downlink signals from base station 110y and other base stations and/or proximity detection signals and P2P signals from other devices. Antennas 1152a through 1152r may provide received signals to demodulators (DEMODs) 1154a through 1154r, respectively. Each demodulator 1154 may condition (e.g., filter, amplify, downconvert, and digitize) a respective received signal to obtain input samples. Each demodulator 1154 may further process the input samples (e.g., for SC-FDMA, OFDMA, CDMA, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate and decode) the detected symbols, provide decoded data for device 120y to a data sink 1160, and provide decoded control information to a controller/processor 1180.

On the uplink, at device 120y, a transmit processor 1164 may receive data from a data source 1162 and control information (e.g., messages for peer discovery) from controller/processor 1180. Processor 1164 may process (e.g., encode and modulate) the data and control information to obtain data symbols and control symbols, respectively. Processor 1164 may also generate reference symbols for reference signals. Processor 1164 may also generate a proximity detection signal comprising a base message or a network-coded message based on any of the designs described above. The symbols from transmit processor 1164 may be precoded by a TX MIMO processor 1166 if applicable, further processed by modulators 1154a through 1154r (e.g., for OFDMA, SC-FDMA, COMA, etc.), and transmitted to base station 110y, other base stations, and/or other devices. At base station 110y, the uplink signals from device 120y and other devices may be received by antennas 1134, processed by demodulators 1132, detected by a MIMO detector 1136 if applicable, and further processed by a receive processor 1138 to obtain decoded data and control information sent by device 120y and other devices. Processor 1138 may provide the decoded data to a data sink 1139 and the decoded control information to controller/processor 1140.

For peer discovery, a channel processor 1184 at device 120y may detect proximity detection signals from other devices and may measure the received signal strength of the detected proximity detection signals. Processor 1158 and/or 1180 may demodulate and decode received symbols for detected proximity detection signals and may provide decoded messages. Processor 1158 and/or 1180 may further process the received symbols to retrieve base messages and may identify peer devices based on the base messages. Processor 1164 and/or 1180 may generate network-coded messages based on the received messages, as described above. Processor 1164 and/or 1180 may also update received matrices, encoding matrices, hop matrices, timestamp vectors, etc. based on messages received from other devices.

Controllers/processors 1140 and 1180 may direct the operation at base station 110y and device 120y, respectively. Processor 1180 and/or other processors and modules at device 120y may perform or direct process 400 in FIG. 4, process 600 in FIG. 6, process 700 in FIG. 7, process 800 in FIG. 8, and/or other processes for the techniques described herein. Processor 1140 and/or other processors and modules at base station 110y may perform or direct process 900 in FIG. 9 and/or other processes for the techniques described herein. Memories 1142 and 1182 may store data and program codes for base station 110y and device 120y, respectively. A communication (Comm) unit 1144 may enable base station 110y to communicate with other network entities. A scheduler 1146 may schedule devices for WAN communication and/or P2P communication and may assign resources to the scheduled devices.

Within network entity 140y, a controller/processor 1190 may perform various functions to support peer discovery. For example, controller/processor 1190 may perform registration of devices for peer discovery, provide parameters for peer discovery with network coding, assign base messages to devices, broadcast information supporting peer discovery by devices, etc. Processor 1190 and/or other processors and modules at network entity 140y may perform or direct process 900 in FIG. 9 and/or other processes for the techniques described herein. A memory 1192 may store program codes and data for network entity 140y. A storage unit 1194 may store information for devices that have registered with network entity 140y, base messages that have been assigned to devices, etc. A communication unit 1196 may enable network entity 140y to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   registering with a network entity for peer discovery by a first device;

receiving, from the network entity, at least one peer discovery parameter to use for peer discovery by the first device;
generating a network-coded message based on the at least one peer discovery parameter, including:
identifying a plurality of messages including a message assigned to the first device and at least one message received by the first device from at least one peer device; and
generating the network-coded message based on a combination of the plurality of messages; and
transmitting the network-coded message by the first device to enable other devices to detect the first device.

2. The method of claim 1, wherein the at least one peer discovery parameter comprises an index of a message assigned to the first device in a set of messages available for peer discovery.

3. The method of claim 1, wherein the at least one peer discovery parameter comprises an identity of a generation selected for the first device among a plurality of generations, each generation being associated with a different set of messages that can be combined for network coding.

4. The method of claim 3, wherein the at least one peer discovery parameter further comprises an index of a message assigned to the first device in a set of messages associated with the generation selected for the first device.

5. The method of claim 3, wherein the at least one peer discovery parameter further comprises a size of the generation selected for the first device.

6. The method of claim 1, wherein generating the network-coded message based on the combination of the plurality of messages comprises:
selecting a vector of coefficients; and
generating the network-coded message based on a message matrix and the vector of coefficients, wherein the plurality of messages are formed into the message matrix and the combination is a linear combination.

7. The method of claim 1, further comprising:
forming an encoding matrix comprising a plurality of encoding vectors corresponding to the plurality of messages formed into a message matrix, one encoding vector for each message in the message matrix, each encoding vector identifying at least one message used to generate a corresponding message in the message matrix; and
generating an encoding vector for the network-coded message based on a linear combination of the plurality of encoding vectors in the encoding matrix.

8. The method of claim 7, wherein the generating the encoding vector comprises:
selecting a vector of coefficients; and
generating the encoding vector for the network-coded message based on the encoding matrix and the vector of coefficients.

9. The method of claim 7, further comprising:
detecting messages from peer devices based on the message matrix and the encoding matrix.

10. The method of claim 1, wherein the at least one peer discovery parameter comprises a maximum number of hops allowed for messages forwarded in network-coded messages, or an age limit for messages forwarded in network-coded messages.

11. The method of claim 1, wherein the at least one peer discovery parameter comprises a limit on the number of network-coded messages that can be transmitted by the first device.

12. The method of claim 1, wherein the at least one peer discovery parameter comprises a limit on the number of network-coded messages that can be transmitted by the first device for each of a plurality of weights, each weight corresponding to a different number of messages to combine to generate a network-coded message.

13. The method of claim 1, further comprising:
receiving another message from a second device at the first device; and
determining whether the other message is an innovative message comprising at least one message not previously received by the first device.

14. The method of claim 1, further comprising:
generating the network-coded message in response to receipt of at least one innovative message by the first device.

15. The method of claim 1, further comprising:
transitioning to an idle state by the first device if no innovative messages are present at the first device; and
skipping transmission of messages for peer discovery by the first device while in the idle state.

16. The method of claim 15, further comprising:
transitioning to an active state by the first device when a predetermined time period has elapsed since the first device transitions to the idle state; and
transmitting at least one message for peer discovery by the first device while in the active state.

17. The method of claim 1, further comprising:
transitioning to an active state by the first device when an innovative message is received at the first device; and
transmitting at least one message for peer discovery by the first device while in the active state.

18. An apparatus for wireless communication, comprising:
means for registering with a network entity for peer discovery by a first device;
means for receiving, from the network entity, at least one peer discovery parameter to use for peer discovery by the first device;
means for generating a network-coded message based on the at least one peer discovery parameter, including:
means for identifying a plurality of messages including a message assigned to the first device and at least one message received by the first device from at least one peer device; and
means for generating the network-coded message based on a combination of the plurality of messages; and
means for transmitting the network-coded message by the first device to enable other devices to detect the first device.

19. The apparatus of claim 18, wherein the at least one peer discovery parameter comprises at least one of:
an index of a message assigned to the first device in a set of messages available for peer discovery,
an identity of a generation selected for the first device from among a plurality of generations,
an index of a message assigned to the first device in a set of messages associated with the generation selected for the first device,
a size of the generation selected for the first device, a maximum number of hops allowed for messages forwarded in network-coded messages,
an age limit for messages forwarded in network-coded messages, or
a limit on the number of network-coded messages that can be transmitted by the first device.

20. The apparatus of claim 18, wherein the means for generating the network-coded message based on the combination of the plurality of messages comprises:
   means for selecting a vector of coefficients; and
   means for generating the network-coded message based on the message matrix and the vector of coefficients, wherein the plurality of messages are formed into the message matrix and the combination is a linear combination.

21. An apparatus for wireless communication, comprising:
   at least one processor configured to:
      register with a network entity for peer discovery by a first device;
      receive, from the network entity, at least one peer discovery parameter to use for peer discovery by the first device;
      generate a network-coded message based on the at least one peer discovery parameter, by:
         identifying a plurality of messages including a message assigned to the first device and at least one message received by the first device from at least one peer device; and
         generating the network-coded message based on a combination of the plurality of messages; and
      send the network-coded message by the first device to enable other devices to detect the first device.

22. The apparatus of claim 21, wherein the at least one peer discovery parameter comprises at least one of an index of:
   a message assigned to the first device in a set of messages available for peer discovery,
   an identity of a generation selected for the first device from among a plurality of generations,
   an index of a message assigned to the first device in a set of messages associated with the generation selected for the first device,
   a size of the generation selected for the first device, a maximum number of hops allowed for messages forwarded in network-coded messages,
   an age limit for messages forwarded in network-coded messages, or
   a limit on the number of network-coded messages that can be transmitted by the first device.

23. The apparatus of claim 21, wherein the at least one processor is configured to:
   select a vector of coefficients; and
   generate the network-coded message based on the message matrix and the vector of coefficients.

24. A computer program product, comprising:
   a non-transitory computer-readable medium comprising:
      code for causing at least one processor to register with a network entity for peer discovery by a first device;
      code for causing the at least one processor to receive, from the network entity, at least one peer discovery parameter to use for peer discovery by the first device;
      code for causing the at least one processor to generate a network-coded message based on the at least one peer discovery parameter, including:
         code for causing the at least one processor to identify a plurality of messages including a message assigned to the first device and at least one message received by the first device from at least one peer device; and
         code for causing the at least one processor to generate the network-coded message based on a combination of the plurality of messages; and
      code for causing the at least one processor to send the network-coded message by the first device to enable other devices to detect the first device.

25. A method for wireless communication, comprising:
   receiving, at a first device, at least one message from at least one peer device;
   selecting one or more messages from among the at least one received message based on at least one criterion;
   generating a network-coded message based on the one or more messages; and
   transmitting the network-coded message by the first device to enable other devices to detect the first device.

26. The method of claim 25, further comprising:
   determining a number of hops associated with each of the at least one received message, wherein each of the one or more messages is associated with a maximum number of hops or fewer.

27. The method of claim 25, further comprising:
   determining a hop vector based on a number of hops associated with each of the one or more messages; and
   sending the hop vector with the network-coded message.

28. The method of claim 25, further comprising:
   determining a timestamp of each of the at least one received message, wherein each of the one or more messages is associated with a timestamp that is more recent than an age limit.

29. The method of claim 25, further comprising:
   determining a timestamp of the network-coded message based on a timestamp of each of the one or more messages; and
   sending the timestamp of the network-coded message with the network-coded message.

30. The method of claim 25, further comprising:
   discarding each received message at the first device associated with a timestamp that is older than an age limit.

31. An apparatus for wireless communication, comprising:
   means for receiving, at a first device, at least one message from at least one peer device;
   means for selecting one or more messages from among the at least one received message based on at least one criterion;
   means for generating a network-coded message based on the one or more messages; and
   means for transmitting the network-coded message by the first device to enable other devices to detect the first device.

32. The apparatus of claim 31, further comprising:
   means for determining a number of hops associated with each of the at least one received message, wherein each of the one or more messages is associated with a maximum number of hops or fewer.

33. The apparatus of claim 31, further comprising:
   means for determining a timestamp of each of the at least one received message, wherein each of the one or more messages is associated with a timestamp that is more recent than an age limit.

34. An apparatus for wireless communication, comprising:
   at least one processor configured to:
      receive, at a first device, at least one message from at least one peer device;
      select one or more messages from among the at least one received message based on at least one criterion;
      generate a network-coded message based on the one or more messages; and
      send the network-coded message by the first device to enable other devices to detect the first device.

35. The apparatus of claim 34, wherein the at least one processor is configured to determine a number of hops associated with each of the at least one received message, and wherein each of the one or more messages is associated with a maximum number of hops or fewer.

36. The apparatus of claim 34, wherein the at least one processor is configured to determine a timestamp of each of the at least one received message, and wherein each of the one or more messages is associated with a timestamp that is more recent than an age limit.

37. A computer program product, comprising:
a non-transitory computer-readable medium comprising:
code for causing at least one processor to receive, at a first device, at least one message from at least one peer device;
code for causing the at least one processor to select one or more messages from among the at least one received message based on at least one criterion;
code for causing the at least one processor to generate a network-coded message based on the one or more messages; and
code for causing the at least one processor to send the network-coded message by the first device to enable other devices to detect the first device.

38. A method for wireless communication, comprising:
assigning at least one peer discovery parameter to a first device for use for peer discovery;
sending the at least one peer discovery parameter to the first device;
receiving an indication of the first device no longer performing peer discovery; and
broadcasting information indicative of the at least one peer discovery parameter assigned to the first device for use by peer devices to purge information collected for the first device.

39. The method of claim 38, wherein the at least one peer discovery parameter comprises an index of a message assigned to the first device in a set of messages available for peer discovery.

40. The method of claim 38, wherein the at least one peer discovery parameter comprises an identity of a generation selected for the first device and an index of a message assigned to the first device in a set of messages associated with the selected generation.

41. The method of claim 38, wherein each peer device is associated with an encoding matrix and a message matrix used by the peer device to generate messages to transmit by the peer device for peer discovery, and wherein the information is used by the peer device to reset entries in the encoding matrix and the message matrix corresponding to the first device.

42. An apparatus for wireless communication, comprising:
means for assigning at least one peer discovery parameter to a first device for use for peer discovery;
means for sending the at least one peer discovery parameter to the first device;
means for receiving an indication of the first device no longer performing peer discovery; and
means for broadcasting information indicative of the at least one peer discovery parameter assigned to the first device for use by peer devices to purge information collected for the first device.

43. The apparatus of claim 42, wherein each peer device is associated with an encoding matrix and a message matrix used by the peer device to generate messages to transmit by the peer device for peer discovery, and
wherein the information is used by the peer device to reset entries in the encoding matrix and the message matrix corresponding to the first device.

44. An apparatus for wireless communication, comprising:
at least one processor configured to:
assign at least one peer discovery parameter to a first device for use for peer discovery;
send the at least one peer discovery parameter to the first device;
receive an indication of the first device no longer performing peer discovery; and
broadcast information indicative of the at least one peer discovery parameter assigned to the first device for use by peer devices to purge information collected for the first device.

45. The apparatus of claim 44, wherein each peer device is associated with an encoding matrix and a message matrix used by the peer device to generate messages to transmit by the peer device for peer discovery, and
wherein the information is used by the peer device to reset entries in the encoding matrix and the message matrix corresponding to the first device.

46. A computer program product, comprising:
a non-transitory computer-readable medium comprising:
code for causing at least one processor to assign at least one peer discovery parameter to a first device for use for peer discovery;
code for causing the at least one processor to send the at least one peer discovery parameter to the first device;
code for causing the at least one processor to receive an indication of the first device no longer performing peer discovery; and
code for causing the at least one processor to broadcast information indicative of the at least one peer discovery parameter assigned to the first device for use by peer devices to purge information collected for the first device.

* * * * *